United States Patent [19]

Rodal et al.

[11] Patent Number: 5,248,112
[45] Date of Patent: Sep. 28, 1993

[54] TAPE TRANSPORT CONTROL SYSTEM WITH A FEEDFORWARD CAPSTAN DRIVE TO THE REEL MOTORS

[75] Inventors: David R. Rodal, Palo Alto; Glenn T. Yoshida, Cupertino, both of Calif.

[73] Assignee: Ampex Systems Corporation, Redwood City, Calif.

[21] Appl. No.: 492,241

[22] Filed: Mar. 8, 1990

Related U.S. Application Data

[63] Continuation of Ser. No. 196,926, May 20, 1988, abandoned.

[51] Int. Cl.$^5$ .............................................. G11B 15/43
[52] U.S. Cl. ...................................... 242/207; 318/7; 360/73.09; 360/96.4
[58] Field of Search ............... 360/73.04, 73.09, 73.11, 360/96.2, 96.3, 96.4; 242/206, 207, 208; 318/6, 7

[56] References Cited

U.S. PATENT DOCUMENTS

| | | | |
|---|---|---|---|
| 2,909,337 | 10/1959 | Lahti et al. | 360/73.04 |
| 3,807,654 | 4/1974 | Hall, Sr. | 242/206 |
| 4,347,994 | 9/1982 | de Boer | 242/203 |
| 4,400,745 | 8/1983 | Shu | 360/73.11 |
| 4,461,433 | 7/1984 | Kani | 242/75.51 |
| 4,461,443 | 7/1984 | Kani | 318/7 X |
| 4,513,229 | 4/1985 | Kudelski | 242/75.51 |

*Primary Examiner*—Katherine Matecki
*Attorney, Agent, or Firm*—George B. Almeida

[57] ABSTRACT

A feedforward circuit applies a capstan drive current, or its equivalent, to the reel tension servo circuits whose associated reels are transporting the tape. The additional drive current to the reel drive motors increases the rotational velocity of the reels to maintain the same resultant acceleration between the tape driven by the capstan and the tape being transported between reels. Since the tape pack affects the gain of the feedforward circuit, a preselected average gain corresponding to the mean tape pack diameter is used to match different cassette sizes. A microprocessor may be used to provide the various signals and may vary the gain of the feedforward circuit not only in response to reel size but also in response to instantaneous reel tape pack diameter.

16 Claims, 3 Drawing Sheets

TAPE TRANSPORT CONTROL SYSTEM WITH A FEEDFORWARD CAPSTAN DRIVE TO THE REEL MOTORS

This is a continuation of co-pending application Ser. No. 07/196,926 filed on May 20, 1988, now abandoned.

SUMMARY AND BACKGROUND OF THE INVENTION

The invention relates to tape transport capstan and reel tension servo circuits and particularly to a feedforward circuit which applies the capstan drive current to the reel tension servo circuits to force the same resultant tape acceleration from the reel motors, thereby minimizing tension arm movement and tape storage in the tension arms.

In most audio and video tape recorders, and particularly in state-of-the-art broadcast video tape recorders, a capstan and associated capstan servo circuit controls the tape movement, including acceleration and deceleration. In such broadcast recorders, reel tension servo circuits also are used to control the reels, and include tension arms in the circuit to control the tape tension as tape is pulled from the supply reel to the takeup reel, and vice versa. It follows that if an acceleration mode is requested via a reference command, the capstan servo circuit increases the capstan drive current, thereby increasing the rotational velocity of the capstan and accelerating the movement of the tape. Obviously, the increase in the tape velocity demands a corresponding increase in the rotational velocity of the reels. As well known in the art, however, the inertia of the capstan is much less than the inertia of the supply and takeup reels, particularly when a reel has a full tape pack. Furthermore, the response bandwidths of the reel tension servo circuits are much less than that of the capstan servo circuit, wherein accordingly, the reel motor drives always lag the capstan motor drive.

In addition, the reel tension servo circuits are responsive to their respective tension arm movements. Therefore it follows that a reel motor drive requires a tension arm displacement in order to produce an acceleration of the associated reel, or reels, commensurate with the acceleration imparted to the tape by the accelerating capstan. Also, due to the higher inertia and lower bandwidth, the reel cannot provide tape as rapidly as requested by the capstan acceleration. Without suitable compensation, the tension arms would be displaced beyond their usual operating range, and the reel tension servo circuits would undesirably lose control. To prevent the occurrence of such an undesirable operating condition, conventional transport control circuits include a tension arm limit detector circuit coupled between the reel tension servo circuits and the capstan servo circuit. The limit detector circuit generates a signal which instructs the capstan servo circuit to decrease the drive current to the capstan, thereby slowing the capstan and allowing the tension arms to remain within their operating range. However, decreasing the capstan drive current causes a corresponding decrease in the desired acceleration originally requested via the reference command, thereby unduly limiting acceleration, which in effect limits the transport system performance.

It may be seen therefore that the delay due to reel acceleration, delay due to capstan acceleration, and the delay due to the requirement for tension arms displacement, all combine to provide a decrease in system performance. In turn, there is a requirement for greater tape storage in the tension arms, which may cause undue mechanical constraints.

Accordingly, it would be highly desirable to provide a tape transport control system wherein the relatively rapid acceleration of the capstan is fully utilized to advantage, thereby improving the performance of the tape transport. In sophisticated broadcast tape recorders, rapid acceleration and deceleration such as when performing editing processes saves precious time and increases operating efficiency, an extremely important advantage in a broadcast video tape recorder.

The present invention circumvents the disadvantages of previous mention while providing a feedforward circuit which applies capstan drive current, or its equivalent, to the reel tension servo circuits whose associated reels are transporting tape. The additional drive current to the reel motors increases the rotational velocity of the reels thereby maintaining the same resultant acceleration between the tape driven by the capstan and the tape being transported between reels. Since the tape pack diameter affects the gain used in the feedforward circuit, a preselected average gain corresponding to the mean tape pack diameter is used for different cassette sizes to increase the feedforward circuit efficiency.

In one embodiment, a capstan composite error signal indicative of the desired reference command, such as "accelerate to shuttle speed", is supplied to a multiplexer, whose three outputs are individually selectable in response to a digital value indicative of the size of the tape cassette being used. The three outputs correspond to different cassette sizes of small, medium and large, and include selected resistances corresponding to the preferred average gain for the feedforward circuit for the corresponding cassette size. The selected output of the multiplexer is fed to an operational amplifier stage, is filtered, and also limited via a limiter circuit, to provide a takeup feedforward signal to the takeup reel of the transport. The signal is inverted by an inverter stage and is supplied as the supply feedforward signal to the supply reel.

DESCRIPTION OF THE PREFERRED EMBODIMENTS

Figure 1:
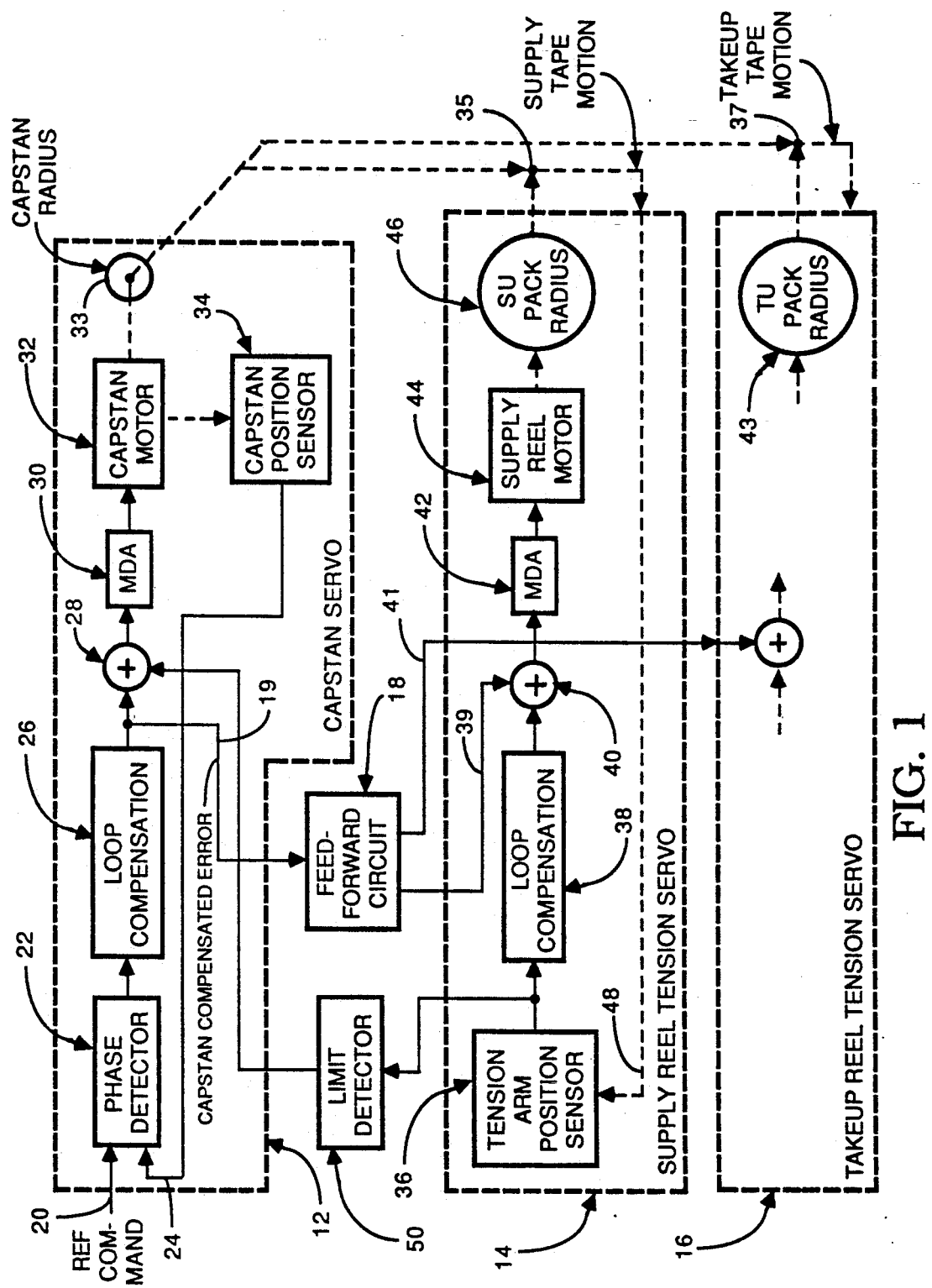
FIG. 1 is a block diagram depicting a feedforward circuit of the invention in the environment of the capstan and reel tension servo circuits of a tape transport.

Referring to FIG. 1, there is depicted a capstan servo circuit 12, and supply and takeup reel tension servo circuits 14, 16, respectively, between which a feedforward circuit 18 of the invention is disposed. Briefly, a capstan compensated error signal, (equivalent to the capstan drive current), which is the voltage command to a voltage-to-current motor amplifier for the capstan, is applied by the feedforward circuit 18 to the reel motors of the reel tension servo circuits 14, 16 via a line 19. The feedforward technique causes the servo circuits 12-16 to provide the same resultant tape acceleration between the capstan and reels which, in turn, minimizes tension arm displacement and corresponding substantial tape storage in the tension arms.

More particularly, a reference command corresponding to an operator input for, for example, a shuttle mode of operation, is applied to an input 20 of a phase detector 22 of the capstan servo circuit 12. A second input signal to the phase detector 22 is supplied via a line 24 and represents the instantaneous angular position of the capstan, as further described below. A phase error signal indicative of any phase difference between the two inputs is applied to a loop compensation circuit 26, which provides sufficient phase lead to stabilize the capstan servo loop. The resulting capstan compensated error signal is applied to a summing circuit 28, which supplies a drive current to a capstan motor drive amplifier (MDA) 30 which, in turn, conventionally drives a capstan motor 32 with a capstan drive current to rotate a capstan 33. A position sensing means 34, such as a digital optical encoder, senses the instantaneous angular position of the capstan 33 in generally conventional manner and, in turn, provides the position indicating second input signal of previous mention to the phase detector 22 in the form of, for example, a pair of frequencies in quadrature, via the line 24.

As described, the capstan motor is mechanically coupled to a capstan identified herein as a (fixed) capstan radius via the circle 33. The interaction of the capstan radius with the supply and takeup reels, and particularly the supply and takeup reel pack radii via transport of the tape therebetween, is pictorially represented via the dashed lines from the capstan radius 33 and respective points 35 and 37. The relative conditions of the tape pack radius and the tape movement by the capstan radius 33, constitutes the supply reel tape motion depicted herein by a dashed line 48 extending to a tension arm position sensor 36, and determines the position and thus the corresponding electrical output signal from sensor 36.

Referring now to the supply reel tension servo circuit 14, the tension arm position sensor 36 supplies an output signal indicative of tension arm displacement relative to a null or center position, to a loop compensation circuit 38 which provides sufficient phase lead to stabilize the reel tension loop. The compensation circuit 38 is coupled via a summing circuit 40 to a motor drive amplifier (MDA) circuit 42 which, in turn, drives a supply reel motor 44. The feedforward signal from the feedforward circuit 18 is applied to the summing circuit 40 via a line 39. Since the condition of the tape pack radius is a part of the reel tension servo loop, the effect thereof is pictorially depicted herein via a supply reel pack radius symbol 46. The interaction of the pack radius, the tape and the capstan radius of capstan 33, is represented via the summing point 35 of previous mention, and describes the supply reel tape motion. The relationship of the reel tape motion to the tension arm position sensor 36 is depicted via the dashed line 48 which completes the supply reel tension servo circuit 14.

As previously mentioned, in conventional servoing circuits, in the event of a large capstan acceleration as when a shuttle mode is requested, the tension arms in the reel tension servo circuits may be displaced beyond their operable range and will hit their associated stops. At this time the tension arms and thus the reel tension servo circuits lose control since they no longer can accurately monitor the tension. Thus, to prevent the undesirable loss of tension arm control, a limit detector circuit 50 supplies a reel coupling signal from the output of the tension arm position sensor 36 to the summing circuit 28 of the capstan servo circuit. The limit detector circuit 50 senses when the tension arms are approaching the limit of their range and supplies a reel coupling signal which limits any further increase in the drive current being supplied to the capstan MDA 30. This prevents an increase in the acceleration of the capstan motor which thus prevents exceeding the tension arm limits. As previously mentioned, this limiting of the capstan acceleration causes a corresponding limitation in the performance of the tape transport. This limiting condition is circumvented by the invention combination which feeds forward the capstan compensated error signal to accelerate the reels sufficiently that the limit detector circuit 50 very seldom need be used in the operation of the tape transport. Instead the limit detector circuit 50 is used as a safety feature for those occasions when unusual conditions tend to drive the tension arms beyond their limits.

It may be seen that the capstan compensated error signal supplied by the loop compensation circuit 26, is the same signal as the capstan drive current, when the supply and takeup tension arms are operating within their limits and no reel coupling signal is applied to the summing circuit 28 from the limit detector circuit 50.

A takeup reel tension servo circuit 16 is coupled to the capstan servo circuit 12 in the same configuration as is the supply reel tension servo circuit 14, and is herein depicted in dashed block. The feedforward circuit 18 provides a takeup feedforward signal to the takeup reel tension servo circuit 16 via a line 41, while the capstan radius 33 interaction with a takeup pack radius 43 is depicted at the point 37 of previous mention. The resulting takeup tape motion conditions are pictorially represented as fed back to the takeup tension arm position sensor (not shown) as described in circuit 14. Since the components are exactly the same as those of the supply reel tension servo circuit 14, the takeup reel tension servo circuit 16 is not shown in further detail.

When the tape has been accelerated to the shuttle speed, the invention feedforward circuit 18 inherently stops functioning as part of the transport servo system. More particularly, upon reaching the velocity requested by the reference command on line 20, the capstan compensated error signal provided by the compensation circuit 26 drops below the voltage threshold set by the diode circuit 58 (FIG. 2) for friction compensation, and the feedforward circuit in essence no longer contributes to the reel drive.

Figure 2:
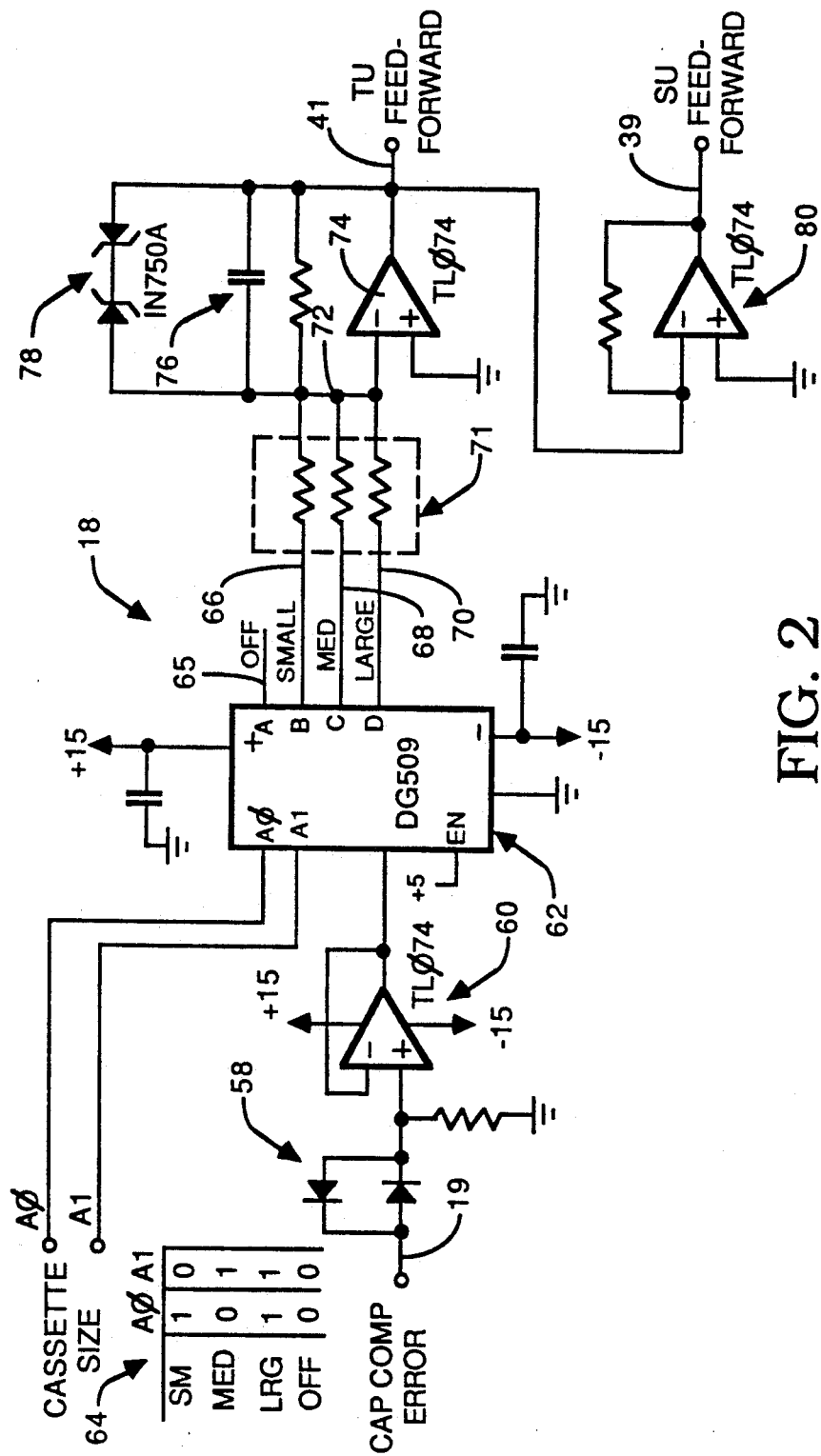
FIG. 2 is a schematic diagram of an embodiment of the invention circuit depicted in FIG. 1.

Referring to FIG. 2, wherein like components of FIG. 1 are similarly numbered, the feedforward circuit 18 is illustrated in a hardware implementation by way of example only. More particularly, the capstan composite error signal generated via the loop compensation circuit 26 of FIG. 1, is supplied to a diode circuit 58 via the line 19 of previous mention. The circuit 58 is used to block the usual friction of the capstan motor. The signal then is fed to a buffer stage 60 and thence to a 1 to 4 multiplexer 62. The control inputs of the multiplexer 62 are supplied with a cassette size binary signal, derived from the tape transport control, which is indicative of the size of the cassette being used in the transport. The binary logic is shown in the table 64, whereby the A0 line and A1 line logic states determine which output of four outputs 65, 66, 68 and 70 of the multiplexer 62 is used. The outputs 66, 68 and 70 include resistors of selected sizes corresponding to small, medium and large cassettes, respectively. Output 65 is used when threading tape or when conducting diagnostics operations on the circuits. The resistors thus comprise a gain adjusting stage 71, with selected precalculated resistances providing an average gain corresponding to a mean tape pack for the respective size of the reel being used. The gain adjusting stage 71 in turn is coupled to a junction 72, as well as to the inverting input of an operational amplifier (op amp) 74, whose noninverting input is coupled to ground. The junction 72 is coupled to a low pass filter circuit 76, as well as to a limiter circuit 78 formed of a pair of zener diodes.

The limiter circuit 78 is included to prevent the capstan servo circuit from improperly controlling the tension arm operation under certain disadvantageous operating conditions which may arise thru use of the feedforward circuit 18. For example, if a malfunction occurs in the tape path such as, for example, the heads or guides become clogged causing greater tape friction, the drive current to the capstan will be increased by the capstan servo circuit feedback. This is an undesirable condition which prevents the capstan from maintaining the right position or acceleration. As a result, the feedforward circuit 18 provides an increase in the capstan compensated error signal on line 19, which supplies more capstan drive current to the reel motor. Eventually the tension arm will correct the malfunction. In the meantime, the feedforward loop may saturate whereby the reel tension servo circuit loses control of the reel drive. Accordingly, the limiter circuit 78 limits the feedforward voltage which can be supplied by the feedforward circuit 18, to a preselected voltage level which prevents the reel tension servo circuit from exceeding its operating range, thus maintaining control.

The limited output of the op amp 74 supplies a takeup reel feedforward signal on the line 41, as previously shown in FIG. 1. An inverter 80 is coupled to output line 41 and, in turn, provides a supply reel feedforward signal of opposite polarity on the line 39 of previous mention. Thus the reels operate in opposite rotation in response to the feedforward signals, in this exempliary implementation.

Figure 3:
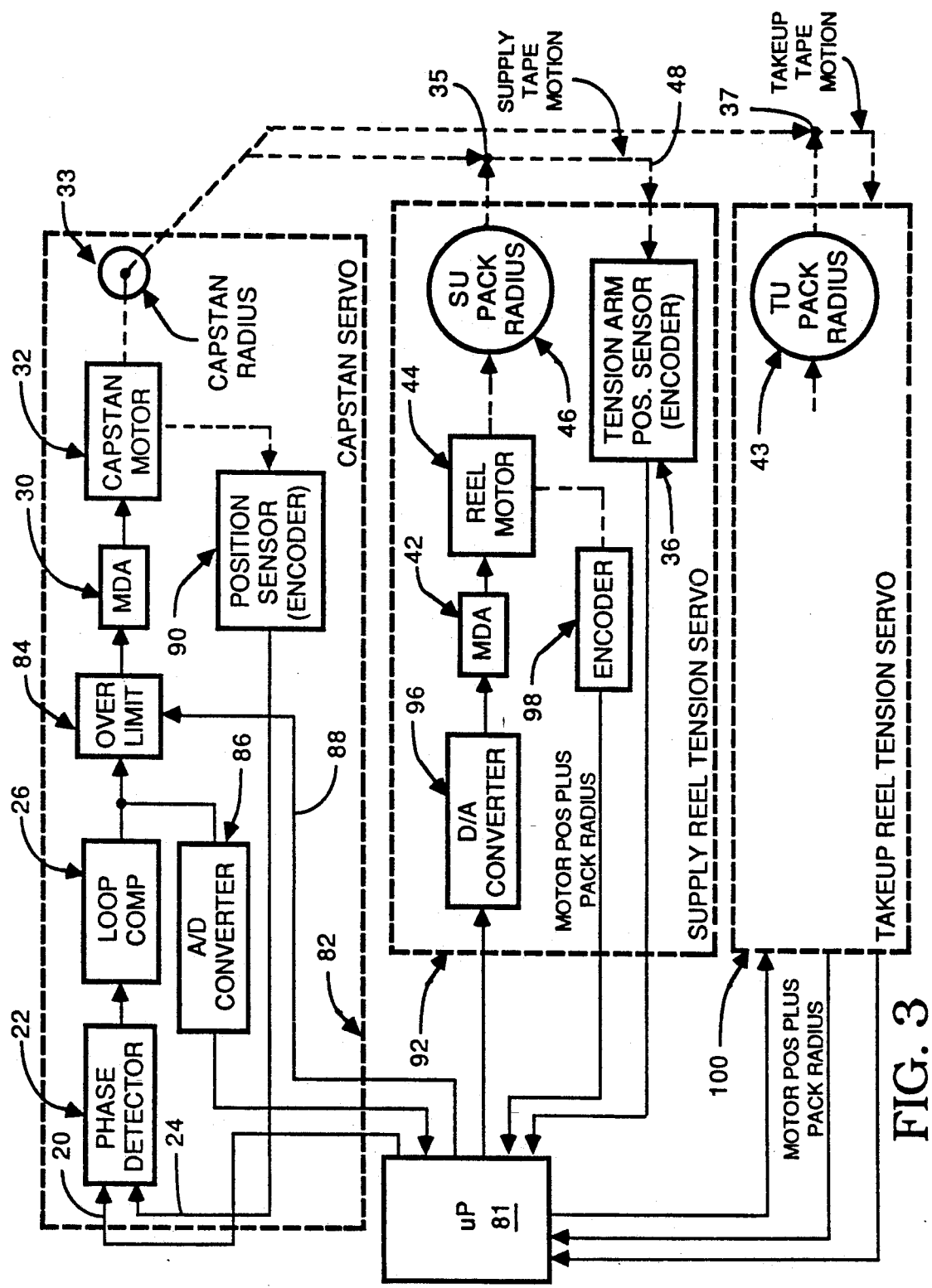
FIG. 3 is a block diagram depicting an alternative embodiment of the circuit of FIG. 2 in the system environment of FIG. 1.

FIG. 3 depicts an alternative embodiment of the invention combination wherein microprocessor means 81 is utilized to provide the function of the feedforward circuit 18 of FIG. 1, as well as the preselected gain values for the different reel sizes. In addition, the microprocessor means 81 also varies the gain for each reel of different size in accordance with a varying tape pack. That is, the microprocessor means 81 replaces the fixed gain adjusting stage 71 with a variable gain adjusting stage, which continuously varies the gain of the feedforward circuit 18 in response to the tape pack radius for each of the different reels.

To this end, the reference command signal is supplied by the microprocessor means 81 on line 20, and the capstan feedback signal is applied to the phase detector 22 via the line 24, of a capstan servo circuit 82 generally similar to the circuit 12 of FIG. 1. Like components in FIG. 3 are similarly numbered. Accordingly, in the capstan servo circuit 82, the phase detector 22 is coupled to the loop compensation circuit 26 and thence to a current limiter 84, as well as to an A/D converter 86. The converter 86 is coupled to the microprocessor 81 and provides a capstan compensated error signal equivalent to that on line 19 of FIG. 1, which corresponds to the feedforward signal of previous mention. A line 88 supplies a reel coupling signal to the current limiter 84, which is the equivalent of the reel coupling signal provided by the limit detector 50 of FIG. 1, and which prevents the loss of tension arm control as previously discussed. The capstan servo circuit includes the MDA 30 coupled to the current limiter 84 and, in turn, is coupled to a capstan 33 having a preselected capstan radius mechanically coupled to the capstan motor 32. The capstan motor position is sensed by an encoder position sensor 90 whose output is supplied via the line 24 to complete the capstan servo loop.

As in FIG. 1, the interaction of the (fixed) capstan radius at 33 with the supply reel pack radius 46, as coupled via the tape, is depicted via the dashed lines extending to the respective interaction points 35, 37. The resulting supply tape motion is monitored, as indicated by dashed line 48, by the tension arm position sensor 36 which, in a digital system, may be a digital optical encoder. The output of the sensor 36 is supplied to the microprocessor 81 to complete the supply tension arm loop.

The microprocessor 81 supplies an output, corresponding to the tension arm sensor output, to a D/A converter 96 in the supply reel tension servo circuit 92. The loop compensation circuit 38 of FIG. 1 has been deleted herein, since the supply reel tension servo circuit 92 is depicted in digital implementation, and the functions of the loop compensation circuit 38 are accomplished via the microprocessor 81. The capstan compensated error signal is supplied to the MDA 42 and thence to the reel motor 44 which drives the supply reel. The pack radius symbol 46 is a pictorial representation of the tape pack radius which interacts with the capstan radius as depicted at the point 35. The resulting supply reel tape motion is depicted as the dashed line 48, as previously described.

A digital optical encoder 98 mechanically is coupled to the reel motor 44, and provides two outputs in quadrature which are indicative of the reel motor position, which signal is supplied to the microprocessor 81. Knowledge of the tape movement from the microprocessor commands, control track signals, etc., plus the reel motor encoder signal, provides the microprocessor means 81 with the information necessary to calculate the reel pack radius.

As is the case in FIG. 1, the capstan radius 33 also is interactive with the takeup reel pack radius 43 of a takeup reel tension servo circuit 100, as depicted at the point 37, and as previously described in FIG. 1. The resulting takeup reel tape motion, and particularly the tape tension condition, is detected by the takeup tension arm position sensor (not shown) of the servo circuit 100. The circuit 100 also receives the input from the microprocessor indicative of the tape tension, and supplies two signals to the microprocessor 81 equivalent to the signals from the encoder 36 and the encoder 98 of the supply reel tension servo circuit 92, as further described below relative to the supply reel tension servo circuit 92.

In operation, it may be seen that the microprocessor controlled feedforward loop of FIG. 3 provides the same function as the hardware embodiment of FIG. 1. The A/D converter 86 supplies a digital capstan compensated error signal to the microprocessor means 81 which, in turn, applies the resulting feedforward signal to the D/A converter 96 of the supply reel tension servo circuit 92, thereby adding the feedforward signal to the supply reel drive current. The combined drive current is applied to the supply reel motor 44. Encoder 98 attached to the reel motor supplies instantaneous reel motor position information to the microprocessor means 81. The microprocessor means uses the instantaneous reel motor position and the instantaneous tape position from various conventional sources such as, for example, a tape control track signal, commands to the capstan servo, a capstan motor encoder signal, etc., to calculate the reel pack radius in generally conventional manner. In addition, the tension arm position sensor 36, which could be an optical encoder, supplies the microprocessor means 81 with a signal indicative of the displacement of the tension arm which, in turn, is used by the microprocessor means to provide reel tension servo feedback information and to prevent capstan servo overdriving.

The microprocessor means 81 uses the pack radius calculation information to calculate the feedforward gain, and with the capstan drive signal derives the feedforward signal. The microprocessor means 81 processes the reel tension servo feedback information through digital compensation and sums it with the feedforward signal. The compensated signal is supplied to the D/A converter 96 and thence to the supply reel motor 44 in accordance with the invention.

Although the capstan servo circuit 82 is depicted herein as an analog implementation, it is to be understood that a digital capstan servo loop similar, for example, to the supply reel tension servo may be used instead. In such an implementation, the microprocessor means 81 supplies the reference command 20 to a D/A converter (not shown), which is coupled to the capstan motor 32 via the MDA 30. The position sensor 90, such as an optical encoder, is coupled mechanically to the capstan motor 32 and supplies the capstan angular position information back to the microprocessor means 81 as depicted in the supply reel tension servo circuit 92.

The takeup reel tension servo circuit 100 is not described herein in detail, but is similar in implementation and function to the supply reel tension servo circuit 92, described fully above.

Although the invention feedforward circuit has been described relative to the acceleration mode of transport operation, it also functions correspondingly in the deceleration mode of operation, as when decelerating rapidly to a stop from a shuttle mode of operation. In such mode, the signals supplied via the feedforward circuit 18 are inverted to thereby apply a opposite current to the supply and takeup reel tension servo circuits 14, 16 or 92, 100 of FIGS. 1 and 3, respectively.

What is claimed is:

1. A circuit in a tape transport apparatus having a tape engaged by a capstan driven by a capstan driving signal, and a reel driven by a reel driving signal, wherein the reel has a preselected reel size and a changing tape pack, comprising:
    feedforward means for applying the capstan driving signal to the reel driving signal to increase the rotational acceleration or deceleration of the reel as required to provide substantially the same resultant tape acceleration or deceleration by the reel as is provided by the capstan, and
    gain adjusting means integral with the feedforward means and responsive to the preselected reel size for selecting the gain of the feedforward means.

2. The circuit of claim 1 wherein the gain adjusting means includes:
    switching means receiving the capstan driving signal and responsive to the reel size for selecting said gain for the feedforward means commensurate with the reel enertia.

3. The circuit of claim 2, wherein the switching means includes:
    means responsive to the reel size for providing a reel size signal; and
    said gain adjusting means receives the capstan driving signal and selects the preselected gain in response to the reel size signal.

4. The circuit of claim 2 wherein the gain adjusting means includes:
    a plurality of resistance means each having a preselected resistance value corresponding to the gain required for a mean tape pack of each of the preselected reel sizes; and
    wherein said switching means is responsive to the reel size for selecting one of the resistance means.

5. The circuit of claim 2 wherein the gain adjusting means and the switching means comprise microprocessor means responsive to the capstan driving signal and to the preselected reel size for selecting the gain of the feedforward means and thus the value of the applied capstan driving signal.

6. The circuit of claim 1 including:
    means integral with the feedforward means for limiting the capstan driving signal applied to the reel driving signal to a preselected maximum which prevents saturating the feedforward means.

7. The circuit of claim 1, wherein a second reel is driven by a respective second reel driving signal, including:
    means coupled to the feedforward signal for supplying an inverted capstan driving signal to the second reel driving signal.

8. The circuit of claim 1, wherein the capstan is driven by a capstan compensated error signal in response to a requested reference command, and the reel is rotated by a reel motor driven by the reel driving signal under control of a tape tension servo, including:
    microprocessor means;
    means for applying the capstan compensated error signal to the microprocessor means in compatible format;
    means responsive to the reel motor for supplying the microprocessor means with an information signal indicative of tape pack radius and reel motor position;
    means integral with the tape tension servo and responsive to the tape pack for supplying the microprocessor means with a tension arm position signal; and
    wherein the microprocessor means combines the capstan compensated error signal with the reel driving signal in response to said information signal and said tension arm position signal.

9. The circuit of claim 8 wherein the microprocessor means further includes:
    means responsive to the preselected reel size and to the changing tape pack, for selecting the gain of the feedforward means.

10. The circuit of claim 8 wherein the applying means includes an A/D converter, and the means for supplying the information signal and the tension arm position signal include respective digital encoder circuits.

11. The circuit of claim 1 including:
    a diode circuit receiving the capstan error signal for setting a voltage threshold indicative of the capstan motor friction to compensate for the effects thereof.

12. The circuit of claim 1 wherein the capstan has a preselected capstan radius, the reel has a given tape pack radius, and the tape transport apparatus includes tension arm position sensing means:

said tension arm position sensing means being responsive to said preselected capstan radius and to said given tape pack radius for generating a tension arm position signal indicative of a difference in the tape acceleration by the reel and the capstan; and said tension arm position sensing means being further responsive to said capstan driving signal being applied to the reel driving signal, for generating an essentially zero tension arm position signal in the presence of the same resultant tape acceleration by the reel and capstan.

13. A circuit in a tape transport apparatus having a capstan driven by a capstan drive, and reels of preselected size driven by respective reel drives, with a capstan driving signal initiated by a requested reference command, comprising:

a feedforward circuit electrically directly coupling said capstan driving signal from the capstan drive to the reel drives and responsive directly to said capstan driving signal itself for forcing the tape acceleration or deceleration at the reels to be substantially the same as the acceleration or deceleration of the tape at the capstan.

14. A circuit in a tape transport apparatus having a capstan driven by a capstan drive, and reels of preselected size driven by respective reel drives, with a capstan driving signal initiated by a requested reference command, comprising:

a feedforward circuit electrically coupled between the capstan drive and the reel drives and responsive to the capstan driving signal for forcing the tape acceleration at the reels to substantially match the acceleration of the tape at the capstan, and gain adjusting means receiving the capstan driving signal and responsive to the preselected reel size for selecting the gain of the feedforward circuit.

15.. The circuit of claim 15 further including:

means for indicating the reel size;

means for providing different values of gain commensurate with the preselected reel size; and switching means receiving the capstan driving signal and responsive to the indicating means for selecting a different value of gain of the providing means.

16. A method for forcing the tape acceleration at a reel to substantially match the acceleration of the tape at a capstan which is pulling the tape, comprising:

supplying a capstan driving signal;

supplying a reel driving signal;

adjusting the gain applied to the capstan driving signal commensurate with the size of the reel; and applying the adjusted capstan driving signal to the reel driving signal to correspondingly match the acceleration or deceleration of the reel.

* * * * *